(12) United States Patent
Hecht

(10) Patent No.: US 12,275,069 B2
(45) Date of Patent: Apr. 15, 2025

(54) CUTTING BLADE HAVING A CLAMPING BORE WITH A COOLANT INLET, BLADE HOLDER AND CUTTING TOOL

(71) Applicant: ISCAR, LTD., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 388 days.

(21) Appl. No.: 17/855,878

(22) Filed: Jul. 1, 2022

(65) Prior Publication Data

US 2024/0001454 A1    Jan. 4, 2024

(51) Int. Cl.
*B23B 27/10* (2006.01)
*B23B 29/04* (2006.01)

(52) U.S. Cl.
CPC ............ *B23B 29/043* (2013.01); *B23B 27/10* (2013.01); *B23B 29/046* (2013.01); *B23B 2210/08* (2013.01); *B23B 2250/12* (2013.01)

(58) Field of Classification Search
CPC ....... B23B 27/10; B23B 27/08; B23B 27/083; B23B 27/086; B23B 29/043; B23B 29/046; B23B 2250/12; B23C 5/28; B23C 5/08; B23C 2250/12
See application file for complete search history.

(56) References Cited

U.S. PATENT DOCUMENTS

| | | | |
|---|---|---|---|
| 3,551,977 A | 1/1971 | Novkov | |
| 3,815,454 A | 6/1974 | Knott | |
| 4,938,641 A | 7/1990 | Maier | |
| 7,217,068 B2 | 5/2007 | Oettle | |
| 8,439,609 B2 * | 5/2013 | Woodruff | B23C 5/109 407/11 |
| 8,596,935 B2 * | 12/2013 | Fang | B23C 5/28 408/59 |
| 10,029,312 B2 * | 7/2018 | Thelin | B23B 27/10 |
| 10,343,222 B2 * | 7/2019 | Schwagerle | B23B 27/086 |
| 10,906,106 B2 * | 2/2021 | Hecht | B23B 29/043 |
| 2013/0236253 A1 * | 9/2013 | Malka | B23B 27/10 407/11 |

(Continued)

FOREIGN PATENT DOCUMENTS

| | | |
|---|---|---|
| CN | 1757471 A | 4/2006 |
| CN | 113600850 A * | 11/2021 |

(Continued)

OTHER PUBLICATIONS

International Search Report dated Aug. 28, 2023, issued in PCT counterpart application No. PCT/IL2023/050575.

(Continued)

*Primary Examiner* — Ryan Rufo
(74) *Attorney, Agent, or Firm* — Womble Bond Dickinson (US) LLP

(57) ABSTRACT

A cutting tool with a coolant system having a cutting blade, a cutting insert and a blade holder. The cutting blade has a first blade bore having a first bore peripheral surface and an entry gap recessed therein. On assembling the cutting tool, a fastening element clamps the first bore peripheral surface and seals the first blade bore, releasably securing the cutting blade to the blade holder and allowing a fluid connection between the blade holder and the cutting blade.

19 Claims, 5 Drawing Sheets

(56) References Cited

U.S. PATENT DOCUMENTS

| | | | |
|---|---|---|---|
| 2015/0063926 A1* | 3/2015 | Wu | B23B 27/141 |
| | | | 407/11 |
| 2017/0326650 A1 | 11/2017 | Schwagerle et al. | |
| 2018/0290218 A1* | 10/2018 | Ericson | B23C 5/26 |
| 2019/0084053 A1* | 3/2019 | Voge | B23B 27/04 |
| 2019/0160550 A1* | 5/2019 | Hecht | B23B 27/04 |
| 2019/0240741 A1* | 8/2019 | Hecht | B23B 27/086 |
| 2020/0055128 A1* | 2/2020 | Lehto | B23C 5/28 |
| 2021/0402489 A1 | 12/2021 | Blabes et al. | |

FOREIGN PATENT DOCUMENTS

| | | | |
|---|---|---|---|
| DE | 3434653 A1 | 4/1985 | |
| DE | 3816931 A1 | 12/1988 | |
| DE | 10 2017 103520 A1 | 8/2018 | |
| EP | 2 745 963 A1 | 6/2014 | |
| EP | 2821167 A1 * | 1/2015 | B23B 27/04 |
| EP | 2730356 B1 * | 9/2016 | B23B 25/06 |
| EP | 3219421 A1 * | 9/2017 | |
| JP | 2018075676 A * | 5/2018 | |
| JP | 2018-149653 | 9/2018 | |
| RU | 2692536 C2 * | 6/2019 | |
| SE | 511366 C2 * | 9/1999 | B23B 27/10 |

OTHER PUBLICATIONS

Written Opinion dated Aug. 28, 2023, issued in PCT counterpart application No. PCT/IL2023/050575.

* cited by examiner

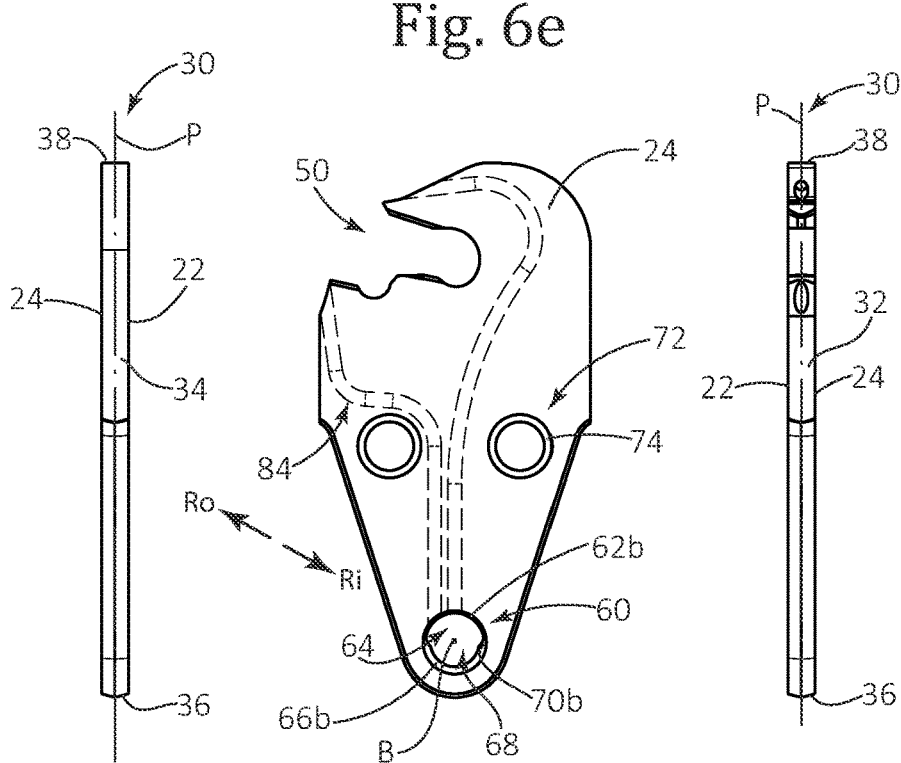
Fig. 6e
Fig. 6d  Fig. 6b  Fig. 6c
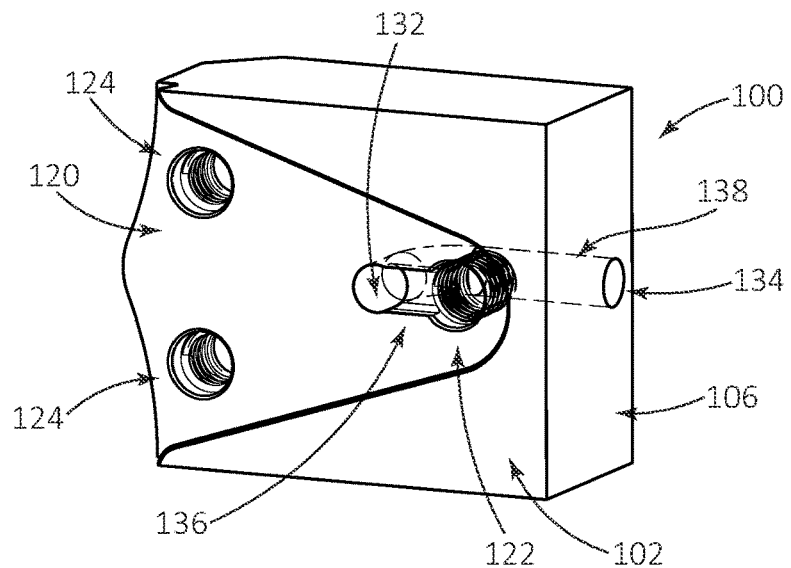
Fig. 7

CUTTING BLADE HAVING A CLAMPING BORE WITH A COOLANT INLET, BLADE HOLDER AND CUTTING TOOL

FIELD OF THE INVENTION

The subject matter of the present application relates to coolant systems in grooving and parting off metal machining tools, and specifically to coolant systems in cutting blades releasably secured to blade holders using fastening members.

BACKGROUND OF THE INVENTION

In the field of metal machining, providing coolant to the cutting edge of the cutting insert is desired, and it is preferable to provide said coolant close to, and directed towards, the cutting edge of the cutting tool. In grooving and parting off operations, the thin cutting blade used in machining operations leads to complications when providing coolant to the cutting edge of the cutting insert.

While there are blades of many widths depending on application, the most preferred blades are as thin as possible to reduce wastage.

Such complications are common in a 2-4 mm cut width blade shaped or plate shaped material (2-4 mm being the most common sizes in the market, even though slightly thinner and slightly thicker sizes exist; while cut width refers to the width of a cutting insert edge, a corresponding blade configured to accommodate such a cutting insert has a typical width of 1.4-3.6 mm), specifically for commonly reversible blades (where the coolant input may be from the opposite side). Numerous solutions were attempted as follows.

One known solution in the field is to supply the coolant through the blade holder to the cutting blade, while fastening the blade to the blade holder with screws. The coolant outlet of the blade holder and the coolant inlet of the cutting blade are aligned with one another in a predetermined position removed from the screw, as seen in CN 1,757,471.

Another solution is to use screws to seal coolant passages, ensuring that coolant is provided to the cutting insert, as seen in DE 3,434,653 and JP 6,880,856.

It is also known in the field to use screws having inner channels to facilitate the passage of coolant to the cutting insert, as seen in EP 2,745,963.

SUMMARY OF THE INVENTION

In accordance with a first aspect of the subject matter of the present application there is provided a cutting blade having a blade width W and comprising: opposite first and second blade side surfaces; a peripheral blade surface connecting the first and second blade side surfaces; a first insert seat located at an intersection of the first blade side surface, the second blade side surface and the peripheral blade surface; a first blade bore opening out to the first and second blade side surfaces; a first blade inlet; and a first blade outlet opening out towards the first insert seat and in fluid connection with the first blade inlet; the first blade bore having a first blade bore axis defining an outward-radial direction extending radially outwardly therefrom and an inward-radial direction opposite to the outward-radial direction; the first blade bore comprising: a first bore edge formed at an intersection of the first blade side surface and the first blade bore; a second bore edge formed at an intersection of the second blade side surface and the first blade bore; and a first bore peripheral surface connecting the first and second bore edges, and comprising a first bore abutment sub-surface; wherein: the first bore peripheral surface further comprises an entry gap recessed further than the first bore abutment sub-surface from the first blade bore axis; and the entry gap is in fluid connection with the first blade inlet.

Some of the advantages of such a cutting blade allows, for example, a commercially available clamping screw to secure, without any extra component such as a rubber O-ring or a metallic ring-shaped sealing element, the cutting blade to a blade holder while also sealing the cutting blade against coolant leaks and allowing a fluid connection between the cutting blade and the blade holder. Additionally, it will be understood that it is preferred to have less components to provide, less components which can fall, and a more compact construction (for example, less lateral projection from the blade). Further, in accordance with preferred features below, such a blade can be used with a fluid connection between the cutting blade and a blade holder when either the first or the second blade side surfaces abut the blade holder (i.e. the cutting blade is indexable).

In accordance with a second aspect of the subject matter of the present application there is provided a cutting tool comprising: a blade holder; a fastening element; a cutting blade according to the first aspect, releasably secured to the blade holder; and a cutting insert releasably secured to the cutting blade; the blade holder comprises: a holder fastening surface being perpendicular to a holder fastening surface longitudinal plane containing a holder fastening surface longitudinal axis; a first holder bore opening out to the holder fastening surface; and a holder outlet opening out to the holder fastening surface and in fluid connection with a holder inlet; the fastening element comprises: a fastening element engagement portion; and a fastening element head comprising a fastening element abutment surface; the second blade side surface abuts the holder fastening surface; and the fastening element clamps the cutting blade to the blade holder via the first blade bore and the first holder bore and seals the first blade bore at the first bore edge.

Such a cutting tool simplifies the problem of supplying a coolant to the cutting insert, with minimal leakage and the advantages mentioned above of less components and compact construction. Additionally, in accordance with preferred features below, such a blade holder can allow a cutting blade to abut the holder fastening surface with either the first or second blade side surfaces. Such embodiments are preferred because they allow a fluid connection between the cutting blade and the blade holder when either the first or the second blade side surfaces abut the holder fastening surface.

It is understood that the above-said is a summary, and that features described hereinafter may be applicable in any combination to the subject matter of the present application, for example, any of the following features may be applicable to the cutting blade and/or the blade holder and/or the cutting tool.

The blade width W may fulfill the condition: 1.4 mm≤W≤3.6 mm. It will be understood that there are particular advantages for compact cutting tools, specifically blades with internal coolant and for parting off, such as minimal wastage (removal of material from workpiece) and close to shoulder parting ability. In larger constructions there is room for additional components, thus indexability of the cutting blade is not necessary. Furthermore, in such thin parting blades it is difficult to face an internal construction modified for other components (For example, internal threading of the first blade bore requires a minimal thickness).

The first bore abutment sub-surface may conically taper inwardly towards the first blade bore axis from the first blade side surface. Such a conical taper can reduce the protrusion of the fastening element relative to the cutting tool, while cooperating with the fastening element to seal the cutting blade.

The first bore abutment sub-surface may comprise a first entry abutment sub-surface located between the entry gap and the first bore edge. Having such a surface may improve the sealing capabilities of the fastening element.

The first bore abutment sub-surface and the first entry abutment sub-surface may conically taper inwardly towards the first blade bore axis from the first blade side surface.

An imaginary bisector plane may pass mid-way between the first and second blade side surfaces; the first bore abutment sub-surface is located between the imaginary bisector plane and the first bore edge; the first bore peripheral surface may further comprise a second bore abutment sub-surface located between the imaginary bisector plane and the second bore edge; and the entry gap opens out to the first and second bore abutment sub-surfaces.

The first bore abutment sub-surface may conically taper inwardly towards the first blade bore axis from the first blade side surface to the imaginary bisector plane; and the second bore abutment sub-surface may conically taper inwardly towards the first blade bore axis from the second blade side surface to the imaginary bisector plane.

The first and second bore abutment sub-surfaces may conically taper relative to the blade bore axis B at a cone angle $\alpha$. The cone angle $\alpha$ may fulfill the condition: $40° \leq \alpha \leq 140°$.

The cone angle $\alpha$ may further fulfill the condition: $50° \leq \alpha \leq 90°$.

The cone angle $\alpha$ may further fulfill the condition: $55° \leq \alpha \leq 70°$, which is believed, in theory, to be optimal for both coolant sealing and securing the blade to the blade holder.

The first bore abutment sub-surface may comprise a first entry abutment sub-surface located between the entry gap and the first bore edge; and the second bore abutment sub-surface may comprise a second entry abutment sub-surface located between the entry gap and the second bore edge.

The first bore abutment sub-surface and the first entry abutment sub-surface may conically taper inwardly towards the first blade bore axis from the first blade side surface; and the second bore abutment sub-surface and the second entry abutment sub-surface may conically taper inwardly towards the first blade bore axis from the first blade side surface.

The first bore abutment sub-surface may comprise a first entry abutment sub-surface located between the entry gap and the first bore edge; and the fastening element abutment surface abuts against the first entry abutment sub-surface.

The fastening element may be flush with, or recessed relative to, the first blade side surface.

The holder fastening surface may be mirror symmetric with respect to the imaginary holder fastening surface longitudinal plane.

The first holder bore and the holder outlet may be spaced apart from each other and in fluid connection via a holder groove recessed on the holder fastening surface. Separating the first holder bore from the holder outlet allows each element to function optimally. It will be understood that a combined first holder bore and holder outlet known in the field have a more compact design, however it is preferred that the first holder bore and the holder outlet be connected through a holder groove, with each element functioning in an optimal manner.

The holder outlet may be located closer to a center of the holder fastening surface than the first holder bore. This ensures that the fastening element secures the cutting blade to the blade holder rearwardly, which may be advantageous in some embodiments, for example embodiments having a plurality of holder bores and blade bores.

An imaginary bisector plane may pass mid-way between the first and second blade side surfaces; the first bore abutment sub-surface is located between the imaginary bisector plane and the first bore edge; the first bore peripheral surface may further comprise a second bore abutment sub-surface located between the imaginary bisector plane and the second bore edge; the entry gap may open out to the first and second bore abutment sub-surfaces; and the cutting blade is secured to the blade holder with either: the second blade side surface abutting the holder fastening surface and the fastening element engaging the first holder bore, clamping the first bore abutment sub-surface and sealing the first blade bore at the first bore edge; or the first blade side surface abutting the holder fastening surface and the fastening element engaging the first holder bore, clamping the second bore abutment sub-surface and sealing the first blade bore at the second bore edge.

At the entry gap, the first and second bore abutment sub-surfaces may comprise, respectively, first and second entry abutment sub-surfaces; and the fastening element abutment surface abuts against one of the first and second entry abutment sub-surfaces.

BRIEF DESCRIPTION OF THE FIGURES

For a better understanding of the present application and to show how the same may be carried out in practice, reference will now be made to the accompanying drawings, in which:

FIG. 6b is a side view of the cutting blade of FIG. 6a;

FIG. 6c is a top view of the cutting blade of FIG. 6a;

FIG. 6d is a bottom view of the cutting blade of FIG. 6a;

FIG. 6e is a rear view of the cutting blade of FIG. 6a;

FIG. 7 is a perspective view of a blade holder shown in FIG. 1;

Figure 1:
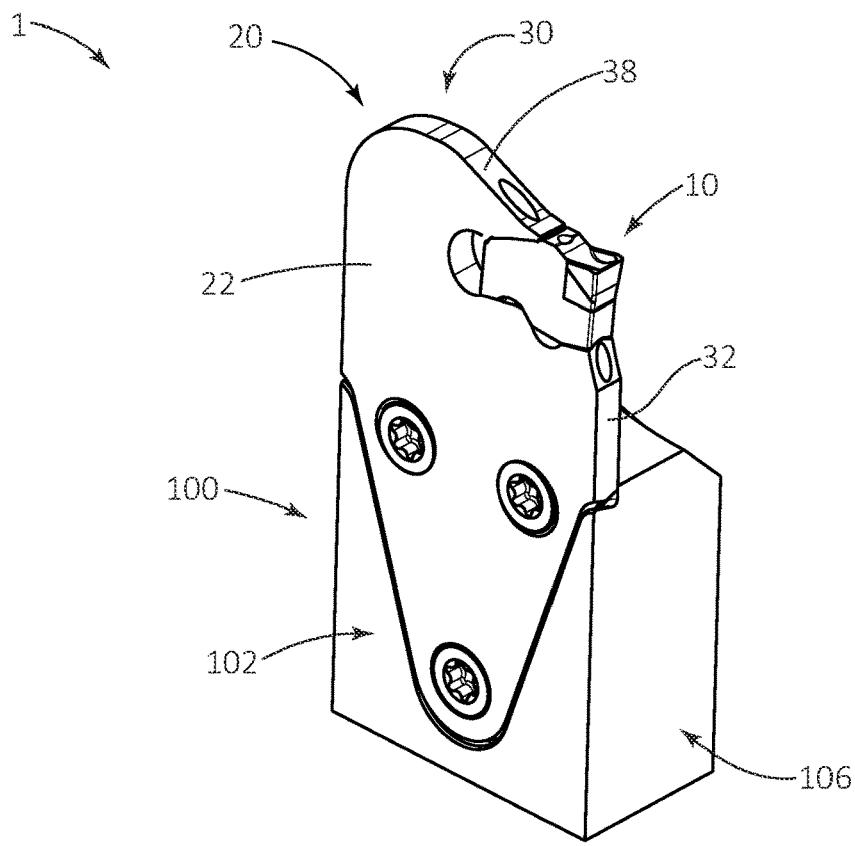
FIG. 1 is a perspective view of a cutting portion of a cutting tool in a first configuration, in accordance with an embodiment of the present invention (it should be understood that the cutting portion will typically have a shank, but since this is a standard component it is not shown or described and hereinafter the words "cutting portion" may be omitted, with only "cutting tool" or "blade holder" used even though it is understood that said shank is implied)

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIGS. 1 to 5, showing a cutting tool 1 having a blade holder 100, a cutting blade 20 releasably secured thereto by a fastening element 150 and a cutting insert 10 releasably secured to the cutting blade 20. Preferably, the cutting insert 10 may be resiliently secured to the cutting blade 20. Such a cutting tool 1 is usually used for grooving and parting operations and is characterized by a thin cutting blade 20.

Drawing attention to FIGS. 6a to 6e, the cutting blade 20 has a first blade side surface 22 and an opposing second blade side surfaces 24. A peripheral blade surface 30 connects the first and second blade side surfaces 22, 24.

The cutting blade 20 is preferably plate-shaped, with elongated first and second blade side surfaces 22, 24. In such case, the peripheral blade surface 30 is elongated along the first and second blade side surfaces 22, 24 and thinner (having a much smaller dimension) in a direction perpendicular to the blade side surfaces 22, 24.

In some embodiments, an imaginary bisector plane P passes mid-way between, the first and second blade side surfaces 22, 24. The imaginary bisector plane P is also preferably, but optionally, parallel to the first and second blade side surfaces 22, 24.

In some embodiments, the peripheral blade surface 30 may have opposite top and bottom blade surfaces 32, 34 and opposite rear and front blade surfaces 36, 38 connecting the top and bottom blade surfaces 32, 34.

A first insert seat 50 is located at an intersection of the first blade side surface 22, the second blade side surface 24 and the peripheral blade surface 30. Specifically, the first insert seat 50 may be located at an intersection of the first blade side surface 22, the second blade side surface 24, the top blade surface 32 and the front blade surface 38. In the cutting blade 20 seen in the figures, the first insert seat 50 is the only insert seat provided on the peripheral blade surface 30. Thus, the cutting blade 20 only has a single insert seat.

A blade width W is measurable between the first and second blade side surfaces 22, 24. In some embodiments, the blade width W may be uniform along the full length of the cutting blade 20. In embodiments with a non-uniform blade width W, the values of the blade width W are measured in the vicinity of the first insert seat 50.

A first blade clamping bore 60 ("first blade bore 60") has a first blade bore axis B and opens out to the first and second blade side surfaces 22, 24. An outward-radial direction Ro is defined as extending radially outwardly from the first blade bore axis B, and an inward-radial direction Ri is defined opposite to the outward-radial direction Ro. The first blade bore axis B may be, preferably but optionally, perpendicular to the imaginary bisector plane P.

The first blade bore 60 has a first bore edge 62a and a second bore edge 62b. The first bore edge 62a is formed at an intersection of the first blade side surface 22 and the first blade bore 60. The second bore edge 62b is formed at an intersection of the second blade side surface 24 and the first blade bore 60.

Figure 6A:
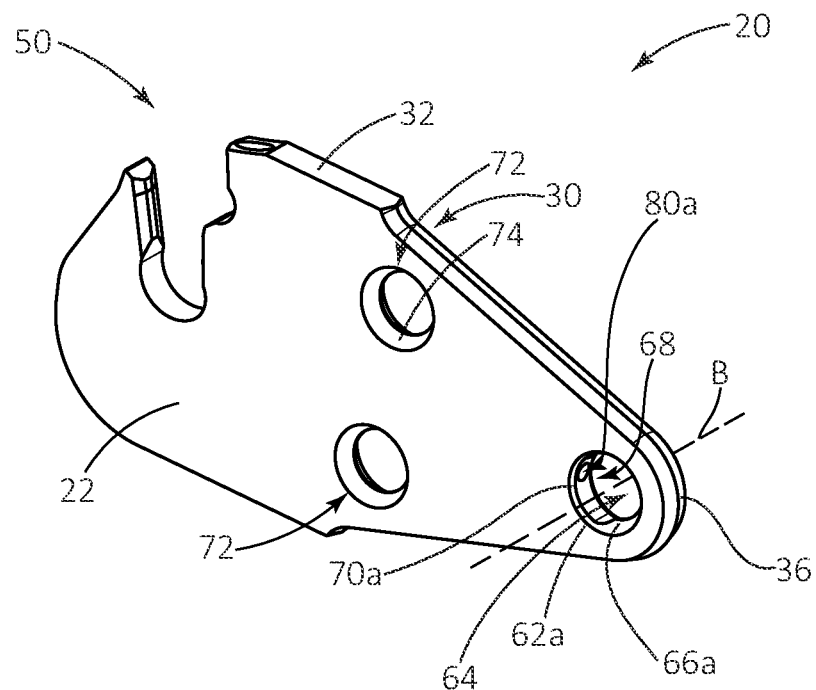
FIG. 6a is a perspective view of a cutting blade show in FIG. 1.

A first bore peripheral surface 64 connects the first and second bore edges 62a, 62b. The first bore peripheral surface 64 has a first bore abutment sub-surface 66a. As shown in FIG. 6a, the first bore abutment sub-surface 66a faces in the same basic direction as the first blade side surface 22. Preferably, the first bore peripheral surface 64 is threadless.

The first bore peripheral surface 64 preferably, but optionally, further has a second bore abutment sub-surface 66b. As shown in FIG. 6b, the second bore abutment sub-surface 66b faces in the same basic direction as the second blade side surface 24. In this case, the first bore abutment sub-surface 66a is located between the imaginary bisector plane P and the first blade side surface 22, and the second bore abutment sub-surface 66b is located between the imaginary bisector plane P and the second blade side surface 24.

The first bore peripheral surface 64 is shaped in a manner allowing a fastening element 150 to clamp directly against it. For example, the first and second bore abutment sub-surfaces 66a, 66b may be, respectively, countersunk relative to the first and second side surfaces 22, 24. This allows the fastening element 150 to be confined to the first blade bore 60, leading to lesser protrusion of the fastening elements 150 relative to the cutting tool 1.

The first bore peripheral surface 64 further has an entry gap 68 (more precisely "entry recess 68") which is recessed further than the first bore abutment sub-surface 66a from the first blade bore axis B. As seen in FIG. 6a, the entry gap 68 circumferentially extends only part-way along the first bore peripheral surface 68. In some embodiments, the entry gap 68 may open out to the first bore abutment sub-surface 66a. The entry gap 68 may further open out to the second bore abutment sub-surface 66b.

The first bore abutment sub-surface 66a may have a first entry abutment sub-surface 70a located at the entry gap 68. Specifically, the first entry abutment sub-surface 70a is located between the entry gap 68 and the first bore edge 62a. The first entry abutment sub-surface 70a is recessed further than a remainder of the first bore abutment sub-surface 66a, relative to the first blade bore axis B. Thus, as best seen in FIG. 6a, in a direction along the first blade bore axis B, a width of the first bore abutment sub-surface 66a along its first entry abutment sub-surface 70a is smaller than a width of the first bore abutment sub-surface 66a away from the first entry abutment sub-surface 70a.

The second bore abutment sub-surface 66b may have a second entry abutment sub-surface located at the entry gap 68. Specifically, the second entry abutment sub-surface 70b is located between the entry gap 68 and the second bore edge 62b. The second entry abutment sub-surface is recessed further than a remainder of the second bore abutment sub-surface 66b, relative to the first blade bore axis B.

In some embodiments, the first bore abutment sub-surface 66a may conically taper inwardly towards the first blade bore axis B, from the first blade side surface 22 to the imaginary bisector plane P. Likewise, the second bore abutment sub-surface 66b may conically taper inwardly towards the first blade bore axis B, from the second blade side surface 24 to the imaginary bisector plane P.

It will be noted that the language of "from" and "to" does not require the first and second bore abutment sub-surfaces 66a, 66b to intersect any of the following: first blade side surface 22, the second blade side surface 24 and the imaginary bisector plane P, but rather that, said differently, a said surface "extends between" any of the imaginary bisector plane P, the first and the second blade side surfaces 22, 24.

Alternative to the inward conical tapering of the first and second bore abutment sub-surfaces 66a, 66b described above and shown, the first and second bore abutment sub-surfaces 66a, 66b may, feasibly although less preferably, have a step configuration (not shown).

In some embodiments, the first bore abutment sub-surface 66a and the first entry abutment sub-surface 70a may conically taper inwardly towards the first blade bore axis B, from the first blade side surface 22. Further, the second bore abutment sub-surface 66b and the second entry abutment sub-surface 70b may conically taper inwardly towards the first blade bore axis B, from the second blade side surface 24.

Figure 5:
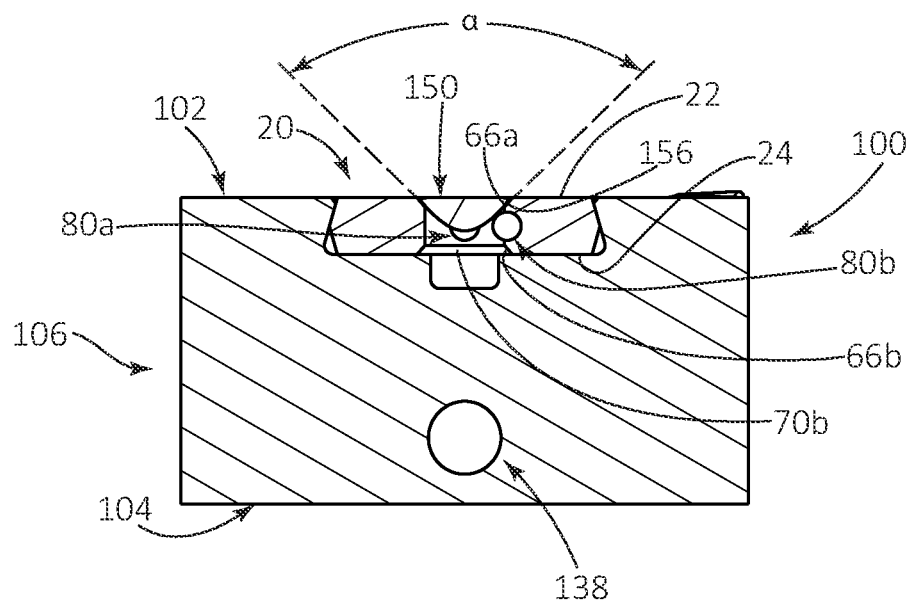
FIG. 5 is a cross section view of the cutting tool of FIG. 1 along line A-A.

In some embodiments, as shown in FIG. 5, the first and second abutment sub-surfaces 66a, 66b conically taper relative to the first blade bore axis B at a cone angle α fulfilling the condition: 40°≤α≤140°. Preferably: 50°≤α≤90°. Most preferably: 55°≤α≤70°.

The first and second bore abutment sub-surfaces 66a, 66b may also be recessed (i.e., set back from) relative to the first and second blade side surfaces 22, 24, respectively. Specifically, the first and second bore abutment sub-surfaces 66a, 66b may be recessed relative to the first and second blade side surfaces 22, 24 in a direction along the first blade bore axis B.

The second bore abutment sub-surface 66b may have mirror image symmetry with the first bore abutment sub-surface 66a relative to the imaginary bisector plane P.

Alternatively, it is possible that there may be no mirror symmetry and the second bore abutment sub-surface 66b may be shaped differently from the first bore abutment sub-surface 66a.

In some embodiments, the cutting blade 20 may further have at least one additional blade clamping bore 72 ("additional blade bore 72"), separate of the first blade bore 60, opening out to the first and second blade side surfaces 22, 24. Each additional blade bore 72 has an additional bore peripheral surface 74 extending between the first and second blade side surfaces 22, 24. Additional blade bores 72 allow better stability of the cutting blade 20 in the blade holder 100. Preferably, but optionally, as seen in the figures, two additional blade bores 72 may be provided, given a total of three bores.

The additional bore peripheral surface 74 is shaped in a manner allowing fastening elements 150 to clamp directly against it. More particularly, the additional bore peripheral surface 74 is countersunk relative to the first and/or second blade side surfaces 22, 24. This allows the fastening element 150 to be confined to the additional blade bore 72, leading to lesser protrusion of the fastening elements 150 relative to the cutting tool 1. For example, the additional bore peripheral surface 74 may have a double ended conical shape, tapering inwardly from the first and second blade side surfaces 22, 24.

Figure 2:
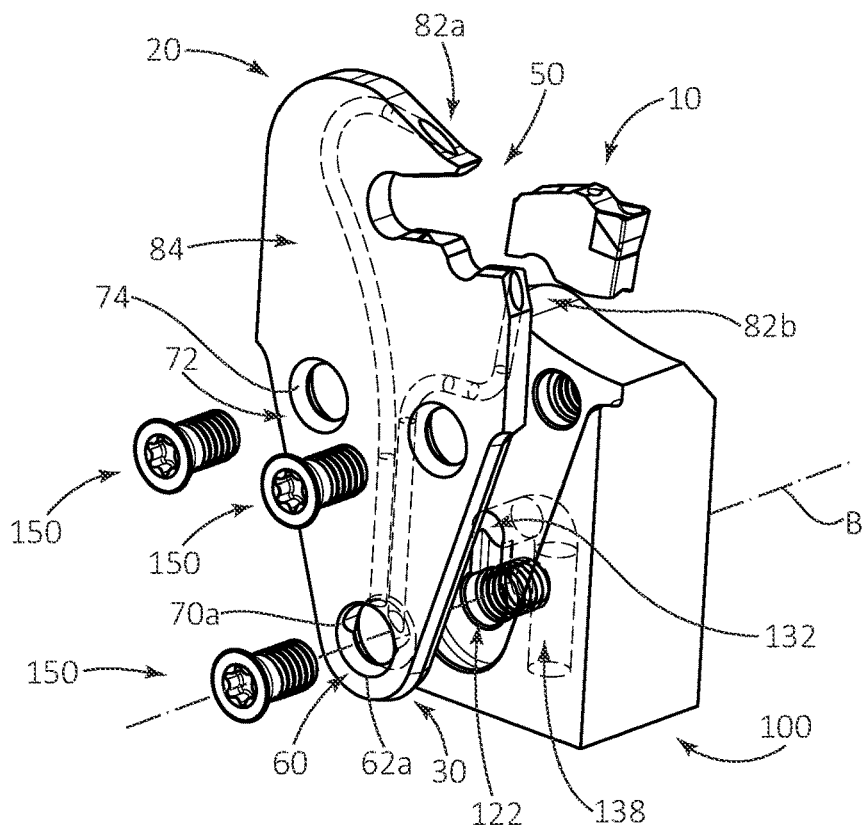
FIG. 2 is an exploded perspective view of the cutting tool of FIG. 1.

As best seen in FIGS. 2 and 6b, all additional blade bores 72 do not allow the passage of coolant therefrom and serve only to fasten the cutting blade 20 to the blade holder 100. It will be noted that, in some embodiments (not shown), it may be found advantageous for one or more additional blade bore 72 to further have a geometry identical to the one shown in the first blade bore 60, as will be discussed below, allowing the passage of coolant therefrom. In such embodiments, the first blade bore 60 could alternatively have a fastening function and only the one or more additional blade bores 72 could be configured to provide coolant. Nonetheless, it will be understood that if two or more bores are used to simultaneously provide coolant this may be beneficial over a single bore, since the total supply of coolant may be increased.

Preferably, when the cutting blade 20 has a plurality of bores, specifically at least a first blade bore 60 and an additional blade bore 72, the blade bores are located proximate the peripheral blade surface 30 and distanced from one another. Having the plurality of bores spread out may allow for improved stability of the fastening of the cutting blade 20 in the blade holder 100.

The cutting blade 20 further has a first blade coolant inlet 80a ("first blade inlet 80a") and a first blade coolant outlet 82a ("first blade outlet 82a") in fluid connection with the first blade inlet 80a. Preferably, but optionally, as seen in FIGS. 5 to 6d, the cutting blade 20 further has a second blade coolant inlet 80b ("second blade inlet 80b") and a second blade coolant outlet 82b ("second blade outlet 82b") in fluid connection with the second blade inlet 80b. For example, blade coolant channels 84 may fluidly connect the first and second blade inlets 80a, 80b to the first and second blade outlets 82a, 82b, as exemplified.

The first and second blade outlets 82a, 82b open out basically directed towards the first insert seat 50, in order to supply coolant to the cutting insert 10 during machining operations. Preferably, but optionally, due to the plate-shape of the cutting blade 20, the first and second blade outlets 82a, 82b open out to the peripheral blade surface 30 in the vicinity of the first insert seat Most preferably, the first and second blade outlets 82a, 82b open out to a different one of the top and the front blade surfaces 32, 38.

The entry gap 68 is in fluid connection with the first and second blade inlets 80a, 80b. Specifically, the first and second blade inlets 80a, 80b may open out to the first bore peripheral surface 64 at the entry gap 68.

Figure 8:
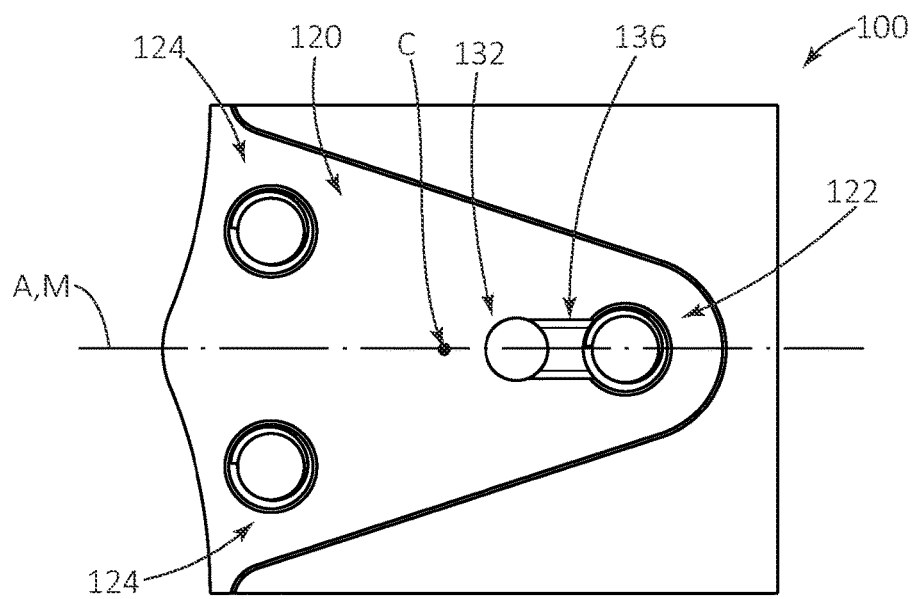
FIG. 8 is a side view of the blade holder of FIG. 7.

As seen in FIGS. 7 and 8, the blade holder 100 has a holder fastening surface 120, a first holder bore 122, a holder outlet 132 and a holder inlet 134. The holder fastening surface 120 is perpendicular to a holder fastening surface longitudinal plane M containing a holder fastening surface longitudinal axis A. The first holder bore 122 opens out to the holder fastening surface 120.

Figure 3:
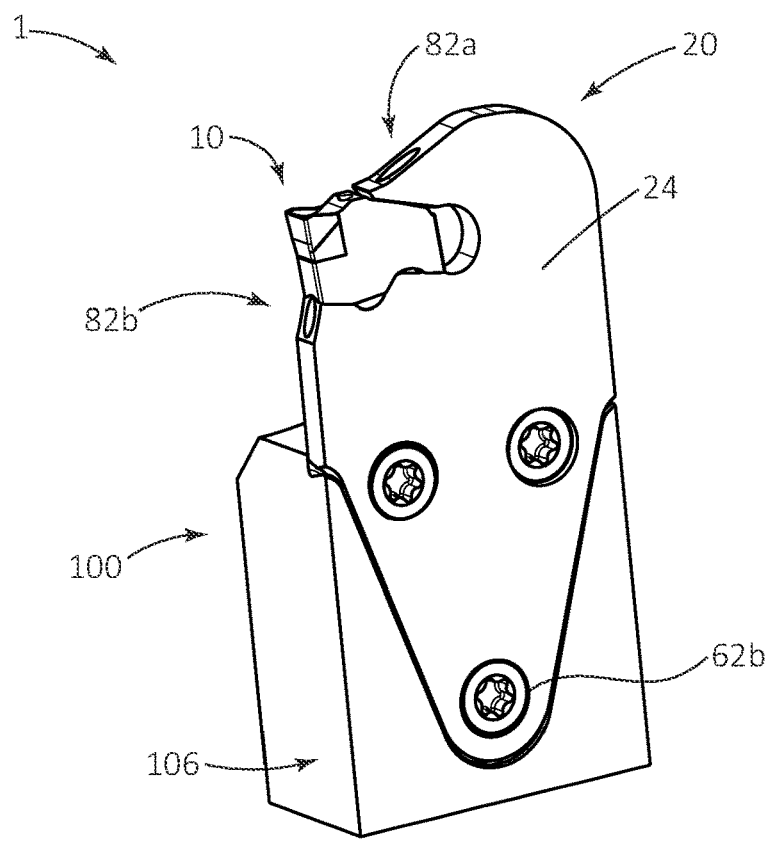
FIG. 3 is a perspective view of the cutting tool of FIG. 1 with a cutting blade secured to a blade holder in a different position (reversed) compared to FIG. 1, in a second configuration of the cutting tool.
Figure 4:
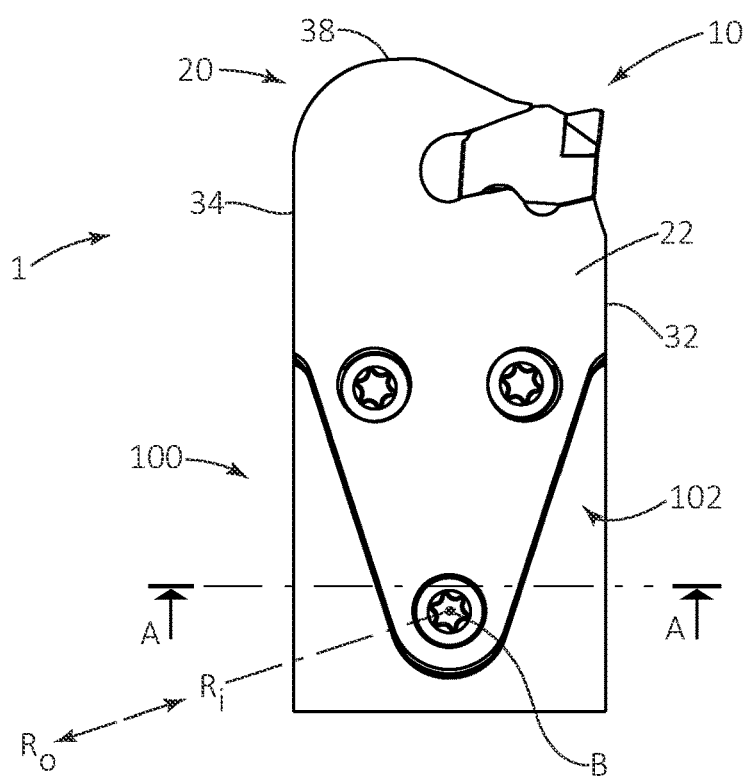
FIG. 4 is a side view of the cutting tool of FIG. 1.

The first and second blade side surfaces 22, 24 each comprise a side abutment surface configured to abut the holder fastening surface. The holder fastening surface 120 can preferably be configured with size and shape to allow selective abutment of the second blade side surface 24 in a first configuration of the cutting tool 1 (as seen in FIG. 1), and the first blade side surface 22 in a second configuration of the cutting tool 1 (as seen in FIG. 3).

For example, the holder fastening surface 120 may be mirror symmetric with respect to the imaginary holder fastening surface longitudinal plane M. This is one preferred option to achieve the first and second configurations mentioned above. Notably, both configurations allow coolant to pass through the cutting blade 20.

The blade holder 100 may also have opposite front and back holder surfaces 102, 104 with a peripheral holder surface 106 located therebetween. In such case, as shown in the figures, the holder fastening surface 120 is preferably located on the front holder surface 102, opposite the back holder surface 104.

The holder outlet 132 opens out to the holder fastening surface 120 and is in fluid connection with the holder inlet 134. For example, as shown in FIGS. 2 and 7, a holder coolant channel 138 can connect the holder outlet 132 to the holder inlet 134. In some embodiments, the blade holder 100 may have a plurality of holder outlets 132.

In some embodiments, the blade holder 100 may further have at least one additional holder bore 124 opening out to the holder fastening surface 120. Having at least one additional holder bore 124 may improve the stability of the fastening of the cutting blade 20 to the blade holder 100.

In some embodiments, the holder outlet 132 may be spaced apart from the first holder bore 122, opening out to the holder fastening surface 120 with no overlap between the holder outlet 132 and the first holder bore 122. In such case, the holder outlet 132 and the first holder bore 122 may be in fluid connection via a holder groove 136 recessed on the holder fastening surface 120.

As discussed below, in the assembled cutting tool 1, the holder groove 136 is in fluid connection with the holder outlet 132 and the entry gap 68 of the cutting blade 20. This allows coolant to be supplied from the blade holder 100 to the first and second blade inlets 80*a*, 80*b* of the cutting blade 20 without compromising the engagement between the first holder bore 122 and the fastening element 150.

In embodiments with the holder outlet 132 separate of the first holder bore 122, and having at least one additional holder bore 124, it is preferable to have the first holder bore 122 and the at least one additional holder bore 124 spaced apart from one another and spread out, thereby increasing the stability of the fastening of the cutting blade 20 to the blade holder 100. Thus, it is preferable, in such cases, that the holder outlet 132 is located closer to a center C of the holder fastening surface 120 than the first holder bore 122. It is further preferable that the holder outlet 132 is located closer to the center C of the holder fastening surface 120 than the at least one additional holder bore 124. Stated differently, it is preferable that the first holder bore 122 is located closer to the periphery of the holder fastening surface 120 than the holder outlet 132.

Alternatively, the holder outlet 132 may merge with the first holder bore 122, with the first holder bore 122 both engaging the fastening element 150 and allowing the passage of coolant to the cutting blade 20. This may be achieved, for example, via a groove (not shown) recessed into a side of the first holder bore 122.

On assembling the cutting tool 1, the second blade side surface 24 is brought into abutment against the holder fastening surface 120. Further, the fastening element 150 passes through the first blade bore 60, engaging the first holder bore 122, clamping the first bore abutment sub-surface 66*a* and securing the cutting blade 20 to the blade holder 100. The holder outlet 132 is then in fluid connection with the first and second blade inlets 80*a*, 80*b*.

As best seen in FIG. 5, the fastening element 150 also serves to seal the first blade bore 60 at the first bore abutment sub-surface 66*a*. Specifically, the fastening element 150 serves two purposes: releasably securing the cutting blade 20 to the blade holder 100, as well as acting as a seal while allowing the passage of coolant from the blade holder 100 into the cutting blade 20.

The fastening element 150 may protrude slightly beyond the cutting blade 20, when fastened to the blade holder 100, in a direction parallel to the first blade bore axis B. Specifically, the fastening element 150 may protrude from the cutting blade 20 by less than 2 millimeters. Preferably, the fastening element 150 protrudes from the cutting blade 20 by less than 1 millimeter. Most preferably, as seen in FIG. 5, the fastening element 150 is flush with, or recessed relative to, the cutting blade 20, in a direction of the first blade bore axis B.

In some embodiments, the cutting blade 20 may be secured to the blade holder 100 in a different position. Specifically, the cutting blade 20 may be secured to the blade holder 100 in a reversed position (as seen in FIG. 3), placing the cutting tool 1 in a second configuration.

In the first position (as seen in FIG. 1), the second blade side surface 24 abuts against the holder fastening surface 120, as discussed above. In said position, the fastening element 150 engages the first holder bore 122, clamps the first bore abutment sub-surface 66*a* and seals the first blade bore 60 at the first bore edge 62*a*. To clarify, the fastening element 150 sealing the first blade bore 60 at the first bore edge 62*a* is to be understood as the fastening element 150 hampering, or preventing, a fluid connection between the first blade bore 60 and the first bore edge 62*a*.

In a reversed position (as seen in FIG. 3), the cutting blade 20 may be secured to the blade holder 100 with the first blade side surface 22 abutting against the holder fastening surface 120. In said position, the fastening element 150 passes through the first blade bore 60, engages the first holder bore 122, clamps the second bore abutment sub-surface 66*b* and seals the first bore blade at the second bore edge 62*b*. The holder outlet 132 is then in fluid connection with the first and second blade inlets 80*a*, 80*b*, with the fastening element 150 releasably securing the cutting blade to the blade holder 100 and sealing the first blade bore 60 at the second bore abutment sub-surface 66*b*. To clarify, the fastening element 150 sealing the first blade bore 60 at the second bore edge 62*b* is to be understood as the fastening element 150 hampering, or preventing, a fluid connection between the first blade bore 60 and the second bore edge 62*b*.

In both positions, as described above, the fastening element 150 acts as a seal, allowing a fluid connection between the first and second blade inlets 80*a*, 80*b* and the holder outlet 132.

Figures 9, 10:
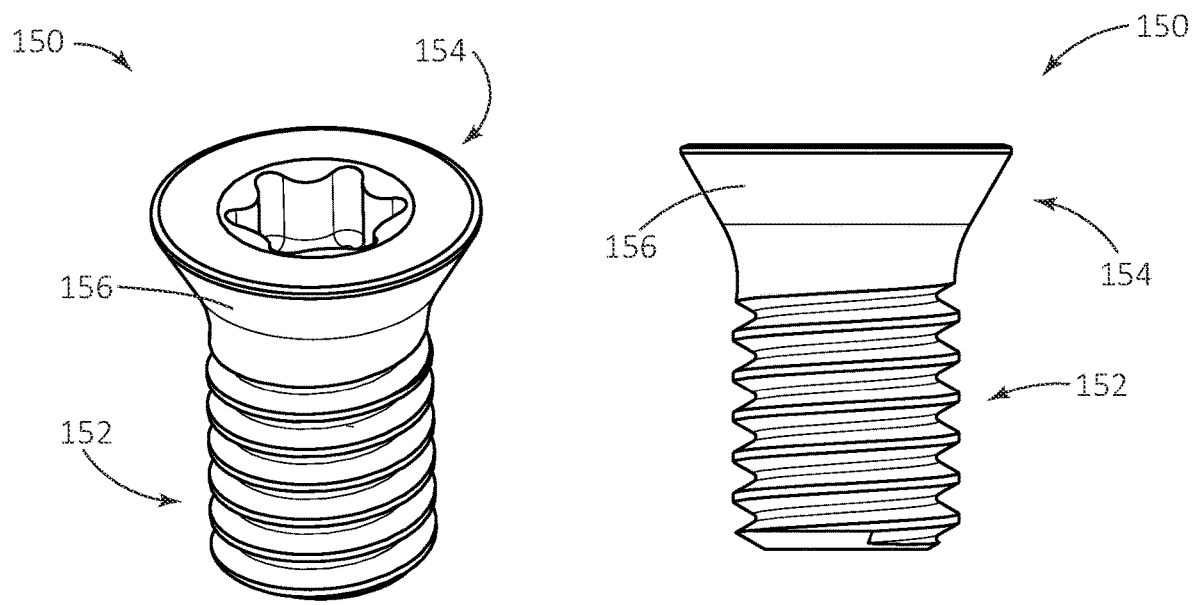
FIG. 9 is a perspective view of a fastening element shown in FIG. 1.
FIG. 10 is a side view of the fastening element of FIG. 9.

Drawing attention to FIGS. 9 and 10, the fastening element 150 has a fastening element engagement portion 152 and a fastening element head 154. The fastening element engagement portion 152 is meant for engagement with a bore machined in the blade holder 100. For example, the engagement between the fastening element engagement portion 152 and the first holder bore 122 may be a threaded engagement, with threads extending along the fastening element engagement portion 152.

The fastening element head 154 has a fastening element abutment surface 156. The fastening element abutment surface 156 may conically taper towards the fastening element engagement portion 152. In such case, the fastening element abutment surface 156 has a cone shape corresponding to that of the first or second bore abutment sub-surfaces 66*a*, 66*b*. Alternatively, in other embodiments, the fastening element abutment surface 156 may be stepped (not shown) to correspond to a stepped first or second bore abutment sub-surface (not shown). The fastening element 150 may be, for example, a conical headed screw.

The fastening element abutment surface 156 abuts against the first bore abutment sub-surface 66*a*. In some embodiments, the fastening element abutment surface 156 may abut either one of the first and second bore abutment sub-surfaces 66a, 66b. Alternatively, the second bore abutment sub-surface 66b may accommodate a differently shaped fastening element.

To clarify, the seal created by the fastening element 150 and the first blade bore 60 hampers, or prevents, a fluid connection (i.e. leak) between the first blade bore 60 and the side surfaces of the cutting tool 1. To elaborate, the seal is between the fastening element abutment surface 156 and one of the first and second bore abutment sub-surfaces 66a, 66b. Further, the seal allows a continuous fluid connection between the holder inlet 134 and the first and second blade outlets 82a, 82b. The seal created by the fastening element 150 and the first blade bore 60 is not necessarily hermetic and may have some leakage.

The fastening element 150 of the present invention is preferably, but optionally, a commercially available clamping screw, shaped and sized to fit the first holder bore 122.

As best seen in FIG. 5, a space for the passage of coolant from the blade holder 100 to the cutting blade 20 is created when the fastening element 150 clamps the cutting blade 20 against the blade holder 100. More specifically, the space may be defined between the fastening element abutment surface 156 abutting one of the first and second bore abutment sub-surfaces 66a, 66b, the other surface of the first and second bore abutment sub-surfaces 66a, 66b, the holder fastening surface 120 and the entry gap 68.

In some embodiments, the fastening element abutment surface 156 may abut the first entry abutment sub-surface 70a, in addition to abutting the first bore abutment sub-surface 66a. Upon reversing the cutting blade 20 in the blade holder 100, the fastening element abutment surface 156 may abut the second entry abutment sub-surface 70b, in addition to abutting the second bore abutment sub-surface 66b. To clarify, reversing the cutting blade 20 refers to disassembling the cutting tool 1 by first disengaging the at least one fastening element 150 from the cutting blade 20 and blade holder 100, flipping the cutting blade 20 around, thereby switching the position of the first and second blade side surfaces 22, 24 and bringing the surface previously not abutting the holder fastening surface 120 into abutment with the holder fastening surface 120. Then, fastening the cutting blade 20 to the blade holder 100.

Although the subject matter of the present application has been described to a certain degree of particularity, it should be understood that various alterations and modifications could be made without departing from the spirit or scope of the invention as hereinafter claimed.

What is claimed is:

1. A cutting blade (20) having a blade width W and comprising:
   opposite first and second blade side surfaces (22, 24);
   a peripheral blade surface (30) connecting the first and second blade side surfaces (22, 24);
   a first insert seat (50) located at an intersection of the first blade side surface (22), the second blade side surface (24) and the peripheral blade surface (30);
   a first blade inlet (80a);
   a first blade outlet (82a) opening out towards the first insert seat (50) and in fluid connection with the first blade inlet (80a); and
   a first blade bore (60) opening out to the first and second blade side surfaces (22, 24), the first blade bore (60) having a first blade bore axis (B) defining an outward-radial direction (Ro) and an inward-radial direction (Ri) opposite to the outward-radial direction (Ro); the first blade bore (60) comprising:
   a first bore edge (62a) formed at an intersection of the first blade side surface (22) and the first blade bore (60);
   a second bore edge (62b) formed at an intersection of the second blade side surface (24) and the first blade bore (60); and
   a first bore peripheral surface (64) connecting the first and second bore edges (62a, 62b), and comprising:
      a first bore abutment sub-surface (66a) which conically tapers inwardly towards the first blade bore axis (B) from the first blade side surface (22); and
      an entry recess (68) in fluid connection with the first blade inlet (80a), the entry recess (68) being spaced apart from the first bore edge (62a) and recessed further than the first bore abutment sub-surface (66a) from the first blade bore axis (B);
   wherein:
      the entry recess (68) circumferentially extends only partway along the first bore peripheral surface (64);
      the first bore abutment sub-surface (66a) comprises a first entry abutment sub-surface (70a) defined between the entry recess (68) and the first bore edge (62a), the first entry abutment sub-surface (70a) also conically tapering inwardly towards the first blade bore axis (B) from the first blade side surface (22); and
      in the outward-radial direction (Ro), a width of the first entry abutment sub-surface (70a) is smaller than a width of the first bore abutment sub-surface (66a) outside of the first entry abutment sub-surface (70a).

2. The cutting blade (20) according to claim 1, wherein:
   the blade width W fulfills the condition: 1.4 mm≤W≤3.6 mm.

3. The cutting blade (20) according to claim 1, wherein:
   an imaginary bisector plane (P) passes mid-way between the first and second blade side surfaces (22, 24);
   the first bore abutment sub-surface (66a) is located between the imaginary bisector plane (P) and the first bore edge (62a);
   the first bore peripheral surface (64) further comprises a second bore abutment sub-surface (66b) located between the imaginary bisector plane (P) and the second bore edge (62b); and
   the entry recess (68) opens out to the first and second bore abutment sub-surfaces (66a, 66b).

4. The cutting blade (20) according to claim 3, wherein:
   the first bore abutment sub-surface (66a) conically tapers inwardly towards the first blade bore axis (B) from the first blade side surface (22) in a direction toward the imaginary bisector plane (P); and
   the second bore abutment sub-surface (66b) conically tapers inwardly towards the first blade bore axis (B) from the second blade side surface (24) in the direction toward the imaginary bisector plane (P).

5. The cutting blade (20) according to claim 4, wherein:
   the first and second bore abutment sub-surfaces (66a, 66b) conically taper relative to the first blade bore axis B at a cone angle α fulfilling the condition: 40°≤α≤140°.

6. The cutting blade (20) according to claim 5, wherein:
   the cone angle α fulfilling the condition: 50°≤α≤90°.

7. The cutting blade (20) according to claim 6, wherein:
   the cone angle α fulfilling the condition: 55°≤α≤70°.

8. The cutting blade (20) according to claim 3, wherein:
   the second bore abutment sub-surface (66b) comprises a second entry abutment sub-surface (70b) located between the entry recess (68) and the second bore edge (62b).

9. The cutting blade (20) according to claim 8, wherein:
the second bore abutment sub-surface (66b) and the second entry abutment sub-surface (70b) conically taper inwardly towards the first blade bore axis (B) from the second blade side surface (24).

10. A cutting tool (1) comprising:
a blade holder (100);
a cutting blade (20) according to claim 1, releasably secured to the blade holder (100) in one of two possible configurations; and
a cutting insert (10) releasably secured to the cutting blade (20);
the blade holder (100) comprises:
a holder fastening surface (120) being perpendicular to a holder fastening surface longitudinal plane (M) containing a holder fastening surface longitudinal axis (A);
a first holder bore (122) opening out to the holder fastening surface (120); and
a holder outlet (132) opening out to the holder fastening surface (120) and in fluid connection with a holder inlet (134);
the fastener (150) comprises:
a fastener engagement portion (152); and
a fastener head (154) comprising a fastener abutment surface (156); wherein:
in a first of the two possible configurations, the second blade side surface (24) abuts the holder fastening surface (120), and the fastener (150) clamps the cutting blade (20) to the blade holder (100) via the first blade bore (60) and the first holder bore (122) and seals the first blade bore (60) at the first bore edge (62a); and
in a second of the two possible configurations, the first blade side surface (22) abuts the holder fastening surface (120), and the fastener (150) clamps the cutting blade (20) to the blade holder (100) via the first blade bore (60) and the first holder bore (122) and seals the first blade bore (60) at the second bore edge (62b).

11. The cutting tool (1) according to claim 10, wherein:
the cutting tool is in the first of the two possible configurations; and
the fastener abutment surface (156) abuts against the first entry abutment sub-surface (70a).

12. The cutting tool (1) according to claim 10, wherein:
the cutting tool is in the first of the two possible configurations; and
the fastener (150) is flush with, or recessed relative to, the first blade side surface (22).

13. The cutting tool (1) according to claim 10, wherein:
the holder fastening surface (120) is mirror symmetric with respect to the imaginary holder fastening surface longitudinal plane (M).

14. The cutting tool (1) according to claim 10, wherein:
the first holder bore (122) and the holder outlet (132) are spaced apart from each other and are in fluid connection via a holder groove (136) recessed on the holder fastening surface (120).

15. The cutting tool (1) according to claim 14, wherein:
the holder outlet (132) is located closer to a center (C) of the holder fastening surface (120) than the first holder bore (122).

16. The cutting tool (1) according to claim 10, wherein:
an imaginary bisector plane (P) passes mid-way between the first and second blade side surfaces (22, 24);
the first bore abutment sub-surface (66a) is located between the imaginary bisector plane (P) and the first bore edge (62a);
the first bore peripheral surface (64) further comprises a second bore abutment sub-surface (66b) located between the imaginary bisector plane (P) and the second bore edge (62b), the second bore abutment sub-surface (66b) comprising a second entry abutment sub-surface (70b) located between the entry recess (68) and the second bore edge (62a); and
the entry recess (68) opens out to the first and second bore abutment sub-surfaces (66a, 66b).

17. The cutting tool (1) according to claim 16, wherein:
the fastener abutment surface (156) abuts against one of the first and second entry abutment sub-surfaces (70a, 70b).

18. The cutting blade (20) according to claim 1, wherein the first insert seat (50) is the only insert seat provided on the peripheral blade surface (30) and the cutting blade (20) only has a single insert seat.

19. The cutting blade (20) according to claim 1, further comprising:
two blade clamping bores (72) opening out to the first and second blade side surfaces (22, 24), each blade clamping bore (72) having respective bore peripheral surfaces (74) extending between the first and second blade side surfaces (22, 24);
wherein:
both of the two blade clamping bores (72) are closer to the first insert seat (50) than the first blade bore (60).

* * * * *